United States Patent Office 3,806,541
Patented Apr. 23, 1974

3,806,541
4-AMINOMETHYLCYCLOHEXANE-1,1
DICARBOXYLIC ACID
Masao Murayama and Eisuke Seto, Kyoto, Takashi Okubo, Uji, and Iwao Morita and Itsuo Dobashi, Kyoto, Japan, assignors to Nippon Shinyaku Co., Ltd., Kyoto, Japan
No Drawing. Original application Nov. 6, 1970, Ser. No. 87,582. Divided and this application Jan. 24, 1972, Ser. No. 220,495
Claims priority, application Japan, Nov. 29, 1969, 44/95,862, 44/95,863, 44/95,864, 44/95,865
Int. Cl. C07c 101/20
U.S. Cl. 260—514 J                 1 Claim

ABSTRACT OF THE DISCLOSURE 4-aminomethylcyclohexane-1,1-dicarboxylic acid, the esters thereof, and salts thereof are chemical intermediates for the preparation of predominantly trans-4-aminomethylcyclohexane-1-carboxylic acid. Cyclohexane-1,1-dicarboxylic acid or an ester thereof is dehydrated to yield the corresponding 3-cyclohexene derivative which is reduced to yield 4-aminomethylcyclohexane-1-1-carboxylic acid or an ester thereof which is then decarboxylated, optionally with hydrolysis of an ester group, to yield the final compound.

CROSS-REFERENCE

This is a division of Ser. No. 87,582 filed Nov. 6, 1970.

DETAILED DESCRIPTION

The present invention pertains to compounds of the formula:

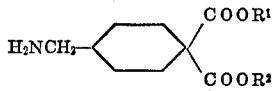

wherein each of $R^1$ and $R^2$ is hydrogen or lower alkyl, and to the acid addition salts thereof.

The term lower alkyl denotes a univalent saturated branched or straight hydrocarbon chain containing from 1 to 6 carbon atoms. Representative of such lower alkyl groups are thus methyl, ethyl, propyl, isopropyl, butyl, isobutyl, sec.butyl, tert.butyl, pentyl, isopentyl, neopentyl, tert-pentyl, hexyl, and the like.

The foregoing compounds are valuable chemical intermediates for the preparation of 4-aminomethylcyclohexane-1-carboxylic acid predominantly in its trans-configuration, a compound useful as a hemostatic agent. The preparation and use of the final compound is described in greater detail in Ser. No. 87,582, the disclosure of which is hereby incorporated by reference.

The compounds of the present invention are obtained from 4-oxocyclohexane-1,1-dicarboxylic acid, preferably as the di(lower alkyl) ester, through treatment with cyanhydrin or with alkali cyanide. The resulting 4-cyano-4-hydroxycyclohexane-1,1-dicarboxylic acid di(lower alkyl) ester may then be hydrolyzed to give the free diacid or may be dehydrated to yield the 4-cyano-3-cyclohexene-1,1-di(lower alkyl) ester which may optionally be hydrolyzed to give the free diacid. Reduction of 4-cyano-3-cyclohexene-1,1-dicarboxylic acid di(lower alkyl) ester or the corresponding diacid, as for example with Raney nickel, yields 4-aminomethylcyclohexane-1,1-dicarboxylic acid, or the corresponding diester, which when heated in a mineral acid at temperatures in the range of from 100 to 230° C. yields predominantly trans-4-amino-methylcyclohexane-1-carboxylic acid.

The following examples will serve to further typify the nature of this invention without being a limitation on the scope thereof, the scope being defined solely by the appended claim.

EXAMPLE 1.—Diethyl 4-cyano-4-hydroxycyclohexane-1,1-dicarboxylate (a) A mixture of diethyl 4-oxocyclohexane-1,1-dicarboxylate (2.4 g.) and acetone cyanhydrin (0.85 g.) is mixed with added triethylamine (0.5 ml.) and allowed to stand overnight, followed by concentration under reduced pressure to give quantitatively diethyl 4-cyano-hydroxycyclohexane-1, 1-dicarboxylate as a viscous oily residue.

(b) Sodium acid sulfite (10 g.) is dissolved in water (30 ml.) and diethyl 4-oxocyclohexane-1, 1-dicarboxylate (7.2 g.) is added thereto followed by stirring.

After 2 hours, potassium cyanide (6 g.) is added followed by stirring. After a further 2 hours, the oil layer formed is taken up with benzene, the extract being dried over sodium sulfate. After removal of the solvent, there is obtained diethyl 4-cyano-4-hydroxycyclohexane-1, 1-dicarboxylate (7 g.).

The cyanhydrin compound obtained in a manner of (a) or (b) was identified by I.R. and T.L.C. In I.R. spectrum, there are shown absorptions of CN (2247 cm.$^{-1}$), OH (3450 cm.$^{-1}$) and ester (1730 cm.$^{-1}$). It is unstable and readily decomposed to the starting oxo-compound when it is distilled.

EXAMPLE 2A.—Diethyl 4-cyano-3-cyclohexene-1,1-dicarboxylate (a) Diethyl 4 - cyano - 4 - hydroxycyclohexane-1, 1-dicarboxylate (2.4 g.) is dissolved in pyridine (7 ml.) and thionyl chloride (2 g.) is added dropwise while stirring with ice-cooling. After stirring the resulting mixture for 2 hours and allowing it to stand overnight at room temperature, ice-water is added thereto, excess thionyl chloride is decomposed and the mixture is then extracted with benzene, the extract being washed with an acid and alkali and dried on sodium sulfate. After removal of benzene by distillation, there is obtained a pale yellow oily product. It is then subjected to distillation in vacuo to afford diethyl 4-cyano-3-cyclohexene-1,1-dicarboxylate (1.6 g.) as an oily product having a boiling point of 140/6 mm. Hg.

(b) Phosphorus pentachloride (22 g.) is suspended in benzene (100 ml.) and diethyl 4-cyano-4-hydroxycyclohexane-1,1-dicarboxylate (20 g.) dissolved in benzene (70 ml.) is slowly added dropwise with stirring. After completion of the dropwise addition, the reaction solution is refluxed for 5 minutes, cooled, and then poured onto ice, the benzene layer separated, washed with water and dried. Benzene is then removed therefrom and the residue is subjected to distillation under reduced pressure to give the desired product (18 g.).

It is confirmed by I.R. and T.L.C. that the products obtained by the methods (a) and (b) are identical, and they are found to be the desired product by N.M.R. and elemental analysis.

I.R. CN (2200 cm.$^{-1}$); ester (1735 cm.$^{-1}$); C=C (1645 cm.$^{-1}$); OH (3450 cm.$^{-1}$) has disappeared.

Elemental analysis.—Calcd. (for $C_{13}H_{17}O_4N$) (percent); C, 62.14; H, 6.82; N, 5.57. Found: C, 61.83, 61.65; H, 6.97, 7.15; N, 6.13, 5.96.

EXAMPLE 2B.—4-cyano-3-cyclohexene-1,1-dicarboxylic acid (a) Diethyl 4-cyano-3-cyclohexene-1, 1-dicarboxylate (2.5 g.), having been prepared in a manner as described in Example 1, is dissolved in ethanol (10 ml.) and a 20% aqueous sodium hydroxide solution (5 ml.) is added thereto followed by heating at a temperature of 70° C. for half an hour. The reaction solution is concentrated under reduced pressure to half its volume, cooled and then made acidic with 10% hydrochloric acid, the resulting oily product being extracted with ether and the extract being dried on sodium sulfate followed by removal of the solvent by distillation to yield crude crystals (2.0 g.), which are further purified by recrystallization from a solvent mixture of acetone and benzene to give colorless crystals with a decomposition point of from 155 to 157° C. The product thus obtained was confirmed, by elemental analysis, I.R., and N.M.R., to be 4-cyano-3-cyclohexene-1,1-dicarboxylic acid.

I.R. —COOH (2570 cm.$^{-1}$, 1745 cm.$^{-1}$ and 1715 cm.$^{-1}$); —C≡N (2225 cm.$^{-1}$); C=C (1640 cm.$^{-1}$).

Elemental analysis.—Calcd. (for $C_9H_9O_4N$) (percent): C, 55.38; H, 4.65; N, 7.18. Found (percent): C, 54.84, 55.38, 55.25; H, 4.89, 4.87, 5.03; N, 6.89, 7.18, 6.80.

(b) A 20% aqueous sodium hydroxide solution is added to 4-cyano-3-cyclohexene-1,1-dicarboxylic acid monomethyl ester (0.5 g.) and the resulting mixture is then heated at a temperature of 70° C. for half an hour, allowed then to cool, made acidic with 10% hydrochloric acid, the resulting oily product being extracted with ether. After drying the ethereal extract, ether is removed by distillation and the residue is washed with benzene to obtain 0.4 g. of crude crystals having a decomposition point of from 152 to 154° C. According to I.R. and T.L.C., the product so obtained was found to be identical with 4-cyano-3-cyclohexene-1,1-dicarboxylic acid obtained in the manner described in (a).

(c) Using 4-cyano-4-hydroxycyclohexane-1,1-dicarboxylic acid, the treatment as described in (a) or (b) of the Example 2A is repeated to obtain the titled desired product.

EXAMPLE 2C.—4-cyano-3-cyclohexene-1,1-dicarboxylic acid monoethyl ester

Diethyl 4-cyano-3-cyclohexene-1,1-dicarboxylate (2.5 g.) prepared in the manner described in Example 1, is dissolved in ethanol (10 ml.), and a 20% aqueous sodium hydroxide solution is added thereto with stirring. After 2 minutes, the resulting mixture is made acidic with 10% hydrochloric acid, and the resulting oily product is extracted with ether, the ethereal extract being dried over sodium sulfate and ether removed by distillation to give 2.3 g. of oily residue. The residue is immediately crystallized and the crystals are recrystallized from benzene to obtain 4-cyano-3-cyclohexene-1,1-dicarboxylic acid monoethyl ester as crystals having a melting point of from 108 to 110° C. The structure of the product may be identified by elemental analysis, I.R. and N.M.R.

Analysis.—Calcd. for $C_{11}H_{13}O_4N$ (percent): C, 59.18; H, 5.87; N, 6.25. Found (percent): C, 59.08, 59.56; H, 6.17, 6.30; N, 6.20, 6.30.

EXAMPLE 2D.—4-cyano-3-cyclohexene-1,1-dicarboxylic acid monomethyl ester

Diethyl 4-cyano-3-cyclohexene-1,1-dicarboxylate prepared in the manner as described in Example 1 is added to a 5% solution of sodium hydroxide in methanol and water is added thereto. The resulting mixture is heated for 3 minutes on a water bath and then treated in the manner as described in Example 3 to give the trans-esterified and hydrolyzed product, 4-cyano-3-cyclohexene-1, 1-dicarboxylic acid monomethyl ester. After recrystallization from benzene, there is obtained a pure product having a melting point of from 105 to 107° C.

Elemental analysis.—Calcd. for $C_{10}H_{11}O_4N$ (percent): C, 57.41; H, 5.30; N, 6.70. Found (percent): C, 57.48, 57.31; H, 5.57, 5.57; N, 6.64, 6.70.

EXAMPLE 3A.—Diethyl 4-aminomethylcyclohexene-1,1-dicarboxylate

Diethyl 4-cyano-3-cyclohexene-1,1-dicarboxylate (15.0 g.) is dissolved in methanol (15 ml.), and Raney-nickel (15 ml.) and concentrated aqueous ammonia (15 ml.) are added thereto to carry out catalytic reduction while passing hydrogen through at room temperature until the theoretical amount of hydrogen is taken up. Subsequently the catalyst is removed by filtration and the filtrate is concentrated under reduced pressure at low temperatures. Dilute hydrochloric acid solubles are then extracted from the residue, the acid solution being neutralized with sodium carbonate and ether added thereto followed by separation. The ether layer is washed with water, the washes united together with the water layer on the separation and subjected to concentration under reduced pressure at low temperatures. Ethyl acetate is added to the resulting concentrated solution, the ethyl acetate layer being washed with saturated aqueous sodium chloride solution, dried on sodium sulfate and concentrated. The residue is diethyl 4-amino-cyclohexane-1,1-dicarboxylate which is identified by I.R. and N.M.R. The yield of the product is 13.8 g. (90%).

Elemental analysis of the picrate, M.P. 203–5° C. (after recrystallization from ethyl acetate).—$C_{19}H_{26}N_4O_{11}$ (percent): Theoretical value: C, 45.91; H, 5.91; N, 11.52. Found value (percent): C, 46.69, 46.77; H, 5.62, 5.59; N, 11.17, 11.46.

EXAMPLE 3B.—4-aminomethylcyclohexane-1,1-dicarboxylic acid (a) 4-cyano-3-cyclohexene-1,1-dicarboxylic acid (2.0 g.) is dissolved in methanol (20 ml.), and a concentrated aqueous ammonia solution (2 ml.) and Raney-nickel (2 ml.) are added to carry out catalytic reduction while passing hydrogen through at room temperature until the theoretical amount of hydrogen is taken up. Then the catalyst is removed from the reaction solution by filtration, the filtrate is concentrated and the residue is, after adding thereto water, treated with an ion-exchange resin, the passed solution being concentrated under reduced pressure and the residue being recrystallized from water to obtain 1.6 g. of 4-aminomethylcyclohexane-1,1-dicarboxylic acid having a melting point (decomposing point) of 225° C. The product was identified as the product obtained in the manner hereinafter described (b).

(b) The method for preparing the desired product by hydrolysis of the diethylester from Example 3A is effected in the following manner:

Diethyl 4 - aminomethylcyclohexane-1,1-dicarboxylate prepared in Example 3A (0.5 g.) is dissolved in a 10% aqueous hydrochloric acid solution and the resulting solution is refluxed for 3.5 hours. The resulting reaction solution is concentrated and the residue is washed with ethanol to obtain 0.3 g. of 4-aminomethyl-cyclohexane-1,1-dicarboxylic acid hydrochloride. M.P. 203° C. (Decomp.).

Elemental analysis of the hydrochloride.—$C_9H_{16}NO_4Cl$ (percent): Theoretical value: C, 45.48; H, 6.79; N, 5.89. Found value (percent): C, 45.56, 45.62; H, 7.22, 6.99; N, 5.85, 5.85.

The hydrochloride is identified as the desired product also by I.R. and N.M.R.

Another embodiment is given below:

Diethyl 4 - aminomethylcyclohexane - 1,1-dicarboxylate (0.4 g.) prepared in Example 3A is dissolved in water-containing ethanol containing 0.4 g. of caustic soda and the resulting solution is refluxed for 4 hours. The reaction solution is then concentrated under reduced pressure and a solution of the residue in water is passed through a weakly acidic ion-exchange resin Amberlite IRC-50 (H-type), the passed solution being concentrated to obtain 0.31 g. of 4-aminomethylcyclohexane-1,1-dicarboxylic acid, which, after recrystallization from $H_2O$, shows a melting point of 225° C. (decomposition).

Elemental analysis.—$C_8H_{15}NO_4$ (percent): Theoretical value: C=53.72, H=7.51, N=6.96. Found value: C=53.53, 53.51; H=7.77, 7.37; N=6.93, 6.97.

The product is identified as the desired one also from I.R. and N.M.R.

EXAMPLE 4A.—4-aminomethylcyclohexane-1-carboxylic acid 4-aminomethylcyclohexane-1,1-dicarboxylic acid (1.0 g.) is dissolved in 60% sulfuric acid followed by heating the solution on an oil bath at bath temperatures of from 150 to 160° C. for about one hour. The reaction solution is then treated with an ion-exchange resin, the passed liquid being concentrated under reduced pressure to give 4-aminomethylcyclohexane-1-carboxylic acid (0.73 g.). The product softens at 250° C. and melts above 300° C. It is then converted to the hydrochloride and the transisomer is separated from the cis-isomer by fractionating crystallization from alcohol, each of the trans- and cis-isomers being treated with an ion-exchange resin to obtain the cis-isomer (0.07 g.) and trans-isomer (0.63 g.) of 4-aminomethylcyclohexane-1-carboxylic acid.

What is claimed is:
1. 4-aminomethylcyclohexane-1,1-dicarboxylic acid.

References Cited

Fetzlor et al. Bulletin de la Societe Chimique de France, 194 (1969).

LORRAINE A. WEINBERGER, Primary Examiner

R. GERSTL, Assistant Examiner

U.S. Cl. X.R.

260—464, 408 J